US012502798B2

(12) United States Patent
Lee et al.

(10) Patent No.: US 12,502,798 B2
(45) Date of Patent: Dec. 23, 2025

(54) RAZOR CARTRIDGE

(71) Applicant: DORCO CO., LTD., Seoul (KR)

(72) Inventors: Hyun Ju Lee, Seoul (KR); Shin Hwan Park, Seoul (KR); Min Joo Park, Seoul (KR)

(73) Assignee: Dorco Co., Ltd., Seoul (KR)

( * ) Notice: Subject to any disclaimer, the term of this patent is extended or adjusted under 35 U.S.C. 154(b) by 389 days.

(21) Appl. No.: 18/058,628

(22) Filed: Nov. 23, 2022

(65) Prior Publication Data

US 2023/0166417 A1 Jun. 1, 2023

(30) Foreign Application Priority Data

Nov. 30, 2021 (KR) ........................ 10-2021-0168715

(51) Int. Cl.
*B26B 21/22* (2006.01)
*B26B 21/40* (2006.01)
*B26B 21/44* (2006.01)

(52) U.S. Cl.
CPC ........ *B26B 21/222* (2013.01); *B26B 21/4031* (2013.01); *B26B 21/4018* (2013.01); *B26B 21/443* (2013.01)

(58) Field of Classification Search
None
See application file for complete search history.

(56) References Cited

U.S. PATENT DOCUMENTS 5,761,814 A 6/1998 Anderson et al.
10,369,714 B2 * 8/2019 Noh .................... B26B 21/4031
10,960,559 B2 3/2021 Kim et al.
2010/0077618 A1 * 4/2010 Peterson ............... B26B 21/565 30/84
2011/0146079 A1 * 6/2011 Clarke .................. B26B 21/222 30/34.05

(Continued)

FOREIGN PATENT DOCUMENTS

CA 2879886 A1 * 1/2014 ......... B26B 21/4031
JP 2009-189589 A 8/2009

(Continued)

OTHER PUBLICATIONS

Extended European Search Report dated Apr. 13, 2023 in corresponding European Application No. 22210161.0.

*Primary Examiner* — Hwei-Siu C Payer

(74) *Attorney, Agent, or Firm* — Knobbe, Martens, Olson & Bear, LLP

(57) ABSTRACT

Provided is a razor cartridge including: a first blade having a first base portion and a first cutting edge formed therein; a second blade disposed in front of the first blade to be adjacent to the first blade, and having a second base portion and a sliding edge therein; and a blade housing supporting the first base portion to have at least a portion of the first cutting edge exposed, and supporting the second base portion to have at least a portion of the sliding edge exposed, and the second blade is formed so that a ratio $t_3/t_4$ of a thickness $t_3$ of the sliding edge to a thickness $t_4$ of the second base portion is less than 1 and greater than a ratio $t_1/t_2$ of a thickness $t_1$ of the first cutting edge to a thickness $t_2$ of the first base portion.

18 Claims, 11 Drawing Sheets

(56) References Cited

U.S. PATENT DOCUMENTS

| | | | | |
|---|---|---|---|---|
| 2014/0026424 | A1 * | 1/2014 | Oglesby | B26B 21/4031 30/50 |
| 2019/0016001 | A1 | 1/2019 | Zucker | |
| 2019/0061184 | A1 | 2/2019 | Lin et al. | |
| 2020/0031006 | A1 * | 1/2020 | Kim | B26B 21/4031 |
| 2023/0166417 | A1 * | 6/2023 | Lee | B26B 21/4031 30/50 |

FOREIGN PATENT DOCUMENTS

| | | | | |
|---|---|---|---|---|
| KR | 10-2008-0108490 | A | 12/2008 | |
| KR | 10-2020-0012489 | A | 2/2020 | |
| KR | 10-2021-0073349 | A | 6/2021 | |
| WO | WO-2015050747 | A1 * | 4/2015 | B26B 21/4012 |

* cited by examiner

RAZOR CARTRIDGE

CROSS REFERENCE TO RELATED APPLICATION

This application claims the benefit of Korean Patent Application No. 10-2021-0168715 filed on Nov. 30, 2021, the contents of which are all hereby incorporated by reference herein in their entirety.

BACKGROUND OF THE DISCLOSURE

Field of the Disclosure

The present disclosure relates to a razor cartridge, and more particularly, to a razor cartridge in which a razor blade is accommodated.

Related Art

In general, a razor is a product for shaving body hair such as facial hair, mustache, beard, and the like, and the razor includes a handle for gripping and a razor cartridge provided with a razor blade for shaving in contact with skin.

The razor includes a replaceable razor in which a razor cartridge can be replaced, and a disposable razor in which a razor cartridge cannot be replaced.

Also, recently, a razor with a razor cartridge including a plurality of razor blades for shaving efficiency has been widely used.

Among razor cartridges, there is a razor cartridge that includes a guard for pulling skin or body hair during shaving. The guard slides on a skin surface in close contact with the skin, pulling the skin or body hair, and a razor blade following the guard cuts the pulled body hair. In this case, the razor blade may cut the body hair in much closer contact with the skin.

However, in the case of a razor cartridge including a plurality of razor blades, it is difficult for a razor blade positioned at the rearmost to effectively pull the skin or body hair due to a distance from the guard.

In addition, multiple razor blades included in the razor cartridge have relative protrusion values with respect to a shaving plane (which is a plane on the guard and a cap of the razor cartridge), and the protrusion values may be negative, neutral, or positive depending on the relative arrangement of the shaving plane and the cutting edges of the razor blades. A protrusion value of a razor blade significantly affects shaving performance, shaving feeling, and the like, and should be set to minimize nicks and cuts while providing clean shaving performance.

In addition, in the razor cartridge including the multiple razor blades, a span distance referring to a distance between cutting edges of adjacent razor blades has a lot to do with discharging performance for residues generated during the shaving and a possibility of skin irritation or shaving cuts during the shaving. For example, the greater the span distance is, the better the residue discharging performance is but more likely the skin enters between the cutting edges. Accordingly, the greater span distance may cause skin irritation and increase a possibility of shaving cuts. Conversely, the shorter the span distance is, the less likely the shaving cuts happen during the shaving but the lower the residue discharge performance is.

SUMMARY

The present disclosure provides a razor cartridge with improved shaving efficiency.

It should be noted that objects of the present disclosure are not limited to the above-mentioned object, and other objects of the present disclosure will be apparent to those skilled in the art from the following descriptions.

In an aspect, there is provided razor cartridge including: a first blade having a first base portion and a first cutting edge formed therein; a second blade disposed in front of the first blade to be adjacent to the first blade, and having a second base portion and a sliding edge therein; and a blade housing supporting the first base portion to have at least a portion of the first cutting edge exposed, and supporting the second base portion to have at least a portion of the sliding edge exposed, and the second blade is formed so that a ratio $t_3/t_4$ of a thickness $t_3$ of the sliding edge to a thickness $t_4$ of the second base portion is less than 1 and greater than a ratio $t_1/t_2$ of a thickness $t_1$ of the first cutting edge to a thickness $t_2$ of the first base portion.

In another aspect, there is provided a razor cartridge including: at least one first blade having a first base portion and a first cutting edge formed therein; at least one second blade having a second base portion and a sliding edge formed therein; and a blade housing supporting the first base portion to have at least a portion of the first cutting edge exposed, and supporting the second base portion to have at least a portion of the sliding edge exposed, and the sliding edge is formed to have a tip radius greater than a tip radius of the first cutting edge.

Other specific details of the present disclosure are included in the detailed description and drawings.

According to the embodiments of the present disclosure, at least following effect can be achieved:

As a blade having a sliding edge formed therein is included between a plurality of blades, it is possible to reduce skin irritation caused during shaving.

As a blade having a sliding edge formed therein is included between the plurality of blades, it is possible to achieve a more improved shaving effect.

It should be noted that effects of the present disclosure are not limited to those described above and other effects of the present disclosure are included following descriptions.

DESCRIPTION OF EXEMPLARY EMBODIMENTS

Figure 1:
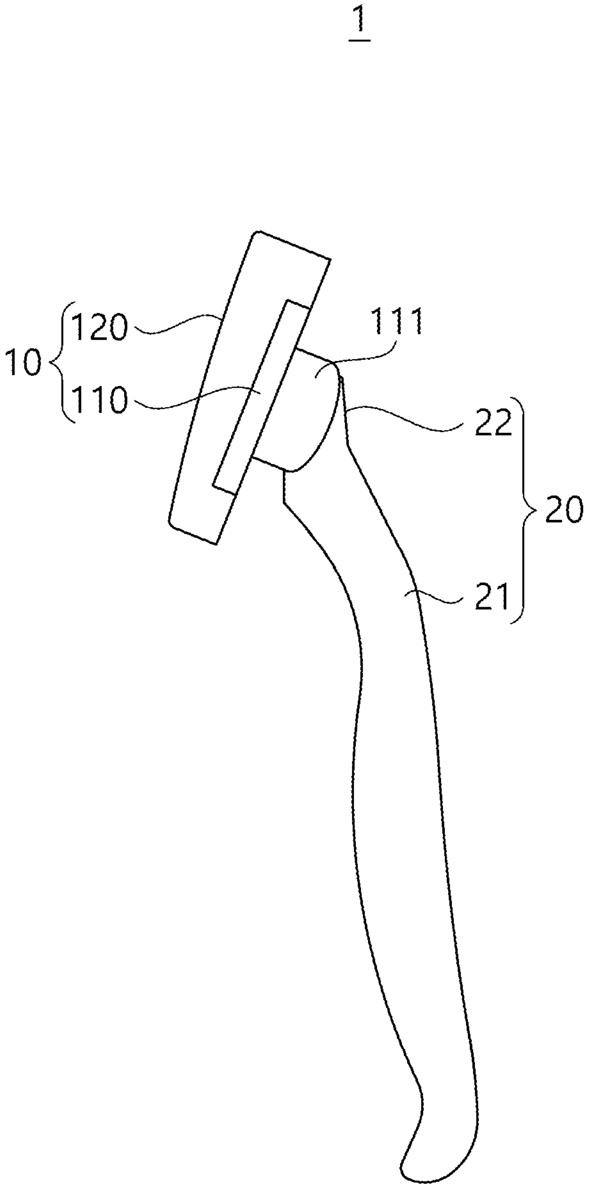
FIG. 1 is a perspective view showing a razor according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined by the appended claims. Like reference numerals refer to like elements throughout the specification.

In addition, embodiments herein will be described with reference to cross-sectional views and/or schematic views, which are ideal exemplary views of the present disclosure. Therefore, the form of an exemplary view may be deformed due to a manufacturing technique and/or an allowable error. In addition, in each drawing of the present disclosure, each element may have been somewhat enlarged or reduced in consideration of convenience of description. Like reference numerals refer to like elements throughout the specification.

Also, in describing the components of the present disclosure, there may be terms used like the first, second, A, B, (i), (ii), (a), and (b). These are solely for the purpose of differentiating one component from the other but not to imply or suggest the substances, order or sequence of the components. In the specification, if a component were described as 'connected', 'coupled', or 'linked' to another component, it may mean the components are not only directly 'connected', 'coupled', or 'linked' but also are indirectly 'connected', 'coupled', or 'linked' via a third component.

Hereinafter, the present disclosure will be described with reference to the drawings for explaining a razor according to an embodiment of the present disclosure.

Figure 2:
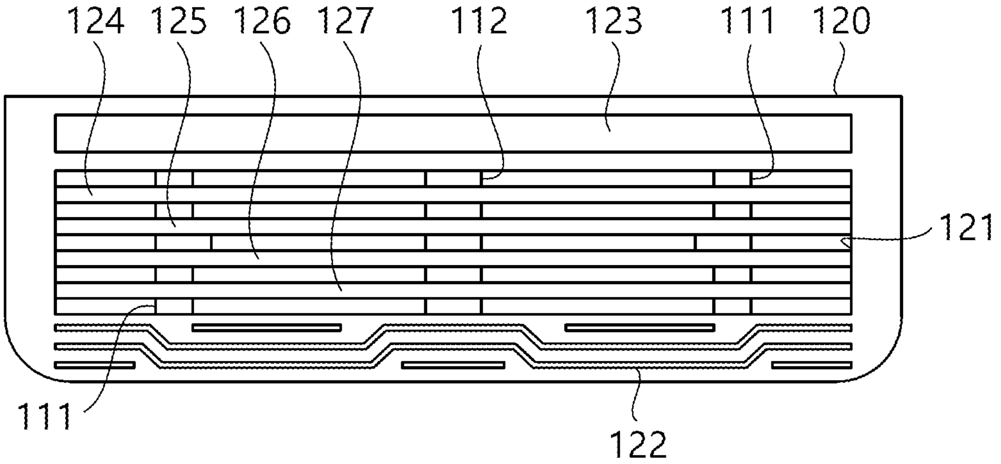
FIG. 2 is a front view of a razor cartridge according to an embodiment of the present disclosure.
Figure 3:
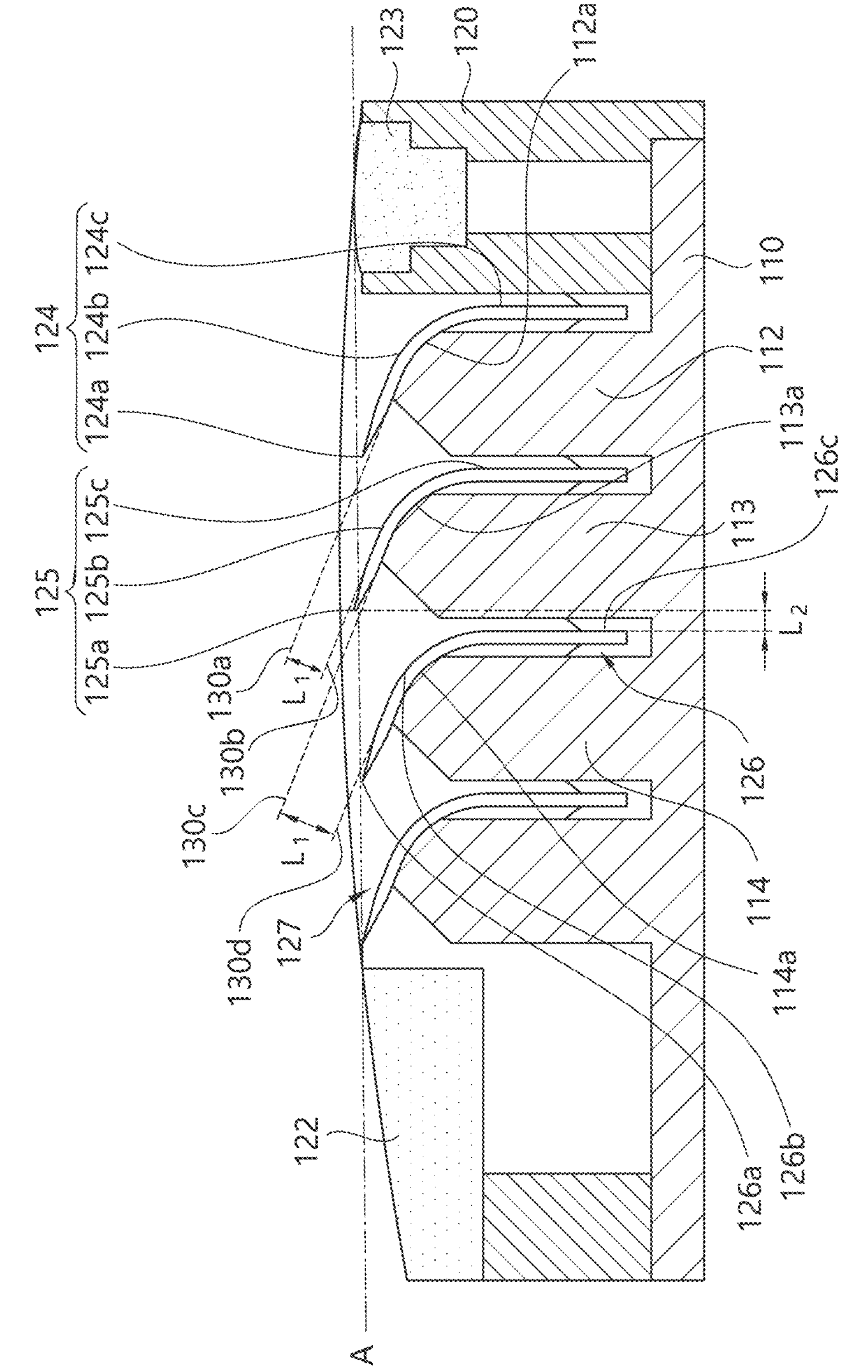
FIG. 3 is a schematic cross-sectional view of a razor cartridge according to an embodiment of the present disclosure.

FIG. 1 is a perspective view showing a razor according to an embodiment of the present disclosure, FIG. 2 is a front view of a razor cartridge according to an embodiment of the present disclosure, and FIG. 3 is a schematic cross-sectional view of a razor cartridge according to an embodiment of the present disclosure.

Referring to FIG. 1, a razor 1 according to an embodiment includes a razor cartridge 10 and a handle 20 to which the razor cartridge 10 is pivotably coupled.

The handle 20 includes a handle body 21 and a handle header 22.

The handle body 21 is a part to be gripped by a user of the razor 1. The handle header 22 is provided at one end of the handle body 21 and detachably coupled to the razor cartridge 10, so that the handle header 22 can pivotably support the razor cartridge 10 coupled thereto.

The handle header 22 is pivotably coupled to a handle coupling portion 111 formed in a rear surface of the razor cartridge 10, so that the razor cartridge 10 can be supported to be pivotable within a predetermined angle range with respect to a fixed shaft or a shaft that moves in a predetermined range.

In addition, the handle header 22 may be detachably coupled to the handle coupling portion 111. In this case, the handle 20 may be provided with a manipulating portion (not shown) for operating the handle header 22, and as the user operates the manipulating portion, the handle header 22 may be decoupled from the handle coupling portion 111.

Meanwhile, referring to FIGS. 2 and 3, the razor cartridge 10 may include a plurality of blades 124, 125, 126, and 127 and a blade housing 110 and 120.

Each of the blades 124, 125, 126, and 127 may include an edge 124*a* or 125*a*, a bending portion 124*b* or 125*b*, and a base portion 124*c* or 125*c*.

The base portion 124*c* or 125*c* are sandwiched by a blade support portion 112 of the rear housing 110, which will be described later, so that a corresponding one of the blades 124, 125, 126, and 127 is maintained in the blade housing 110 and 120.

The bending portion 124*b* or 125*b* forms an obtuse angle from the base portion 124*c* or 125*c* and extends in a shaving direction. The shaving direction is a stroke direction of the razor cartridge 10 during shaving.

The edge 124*a* or 125*a* is formed at an end of the bending portion 124*b* or 125*b* and is formed to extend along a longitudinal direction (a length direction) of a corresponding one of the blades 124, 125, 126, and 127.

FIGS. 2 and 3 show an example in which the four blades 124, 125, 126, and 127 are included in the razor cartridge 10, but the number of the blades 124, 125, 126, and 127 may vary depending on an embodiment.

A detailed description of each of the blades 124, 125, 126, and 127 will be described later.

The blade housing 110 and 120 may include a front housing 120 and a rear housing 110.

The rear housing 110 forms a rear surface of the blade housing 110 and 120, and supports and accommodates the plurality of blades 124, 125, 126, and 127 in the longitudinal direction.

A plurality of blade support portions 112 for respectively supporting the plurality of blades 124, 125, 126, and 127 is formed in the front surface of the rear housing 110. Although not illustrated in the drawings, the blade support portions 112 may be configured to support a central portion and both sides of each of the blades 124, 125, 126, and 127. Each of the blades 124, 125, 126, and 127 may be inserted into a gap between the blade supports 112 to remain accommodated in the rear housing 110.

The front housing 120 includes a blade window 121 that is opened toward the front.

At least a part of the edge 124 *a*, 125 *a*, and 126 *a* of each of the plurality of blades 124, 125, 126, and 127 accommodated in the front housing 120 is exposed to the outside through the blade window 121.

A guard 122 may be provided at one side of the front surface of the front housing 120. The guard 122 is positioned in close contact with a user's skin during the shaving to pull the skin, so that body hair can be cut more deeply. In order to pull the user's skin more effectively, the guard 122 may be formed to have at least one pattern extending approximately in the longitudinal direction, and the guard 122 may be formed based on a rubber material.

Although not illustrated in the drawings, a comb member to align body hair during the shaving may be further provided at one side of the front surface of the front housing 120.

The comb member may be formed to have at least one pattern extending approximately in a transverse direction.

A lubricating band 123 including a lubricating material may be provided at one side of the front surface of the front housing 120.

In this embodiment, the blade housing 110 and 120 including the front housing 120 and the rear housing 110 has been described as an example. However, according to an embodiment as described in Korean Patent Application Publication No. 10-2021-0073349, a razor cartridge in which a blade is accommodated and fixed by a blade housing and a clip may be applied.

Hereinafter, the plurality of blades 124, 125, 126, and 127 will be described in more detail.

The plurality of blades 124, 125, 126, 127 includes a first blade 124, a second blade 125, a third blade 126, and a fourth blade 127. Referring to FIG. 3, the first blade 124 is positioned at the rearmost in a shaving direction (a direction in which the edge 124*a* or 125*a* of each of the blades 124, 125, 126, and 127 is directed), and the second blade 125, the third blade 126, and the fourth blade 127 are sequentially located forward of the first blade 124 in the order.

The first blade 124, the third blade 126, and the fourth blade 127 are respectively identically formed. Therefore, the detailed description of the first blade 124 will apply to a description of the third blade 126 and the fourth blade 127.

Figure 4:
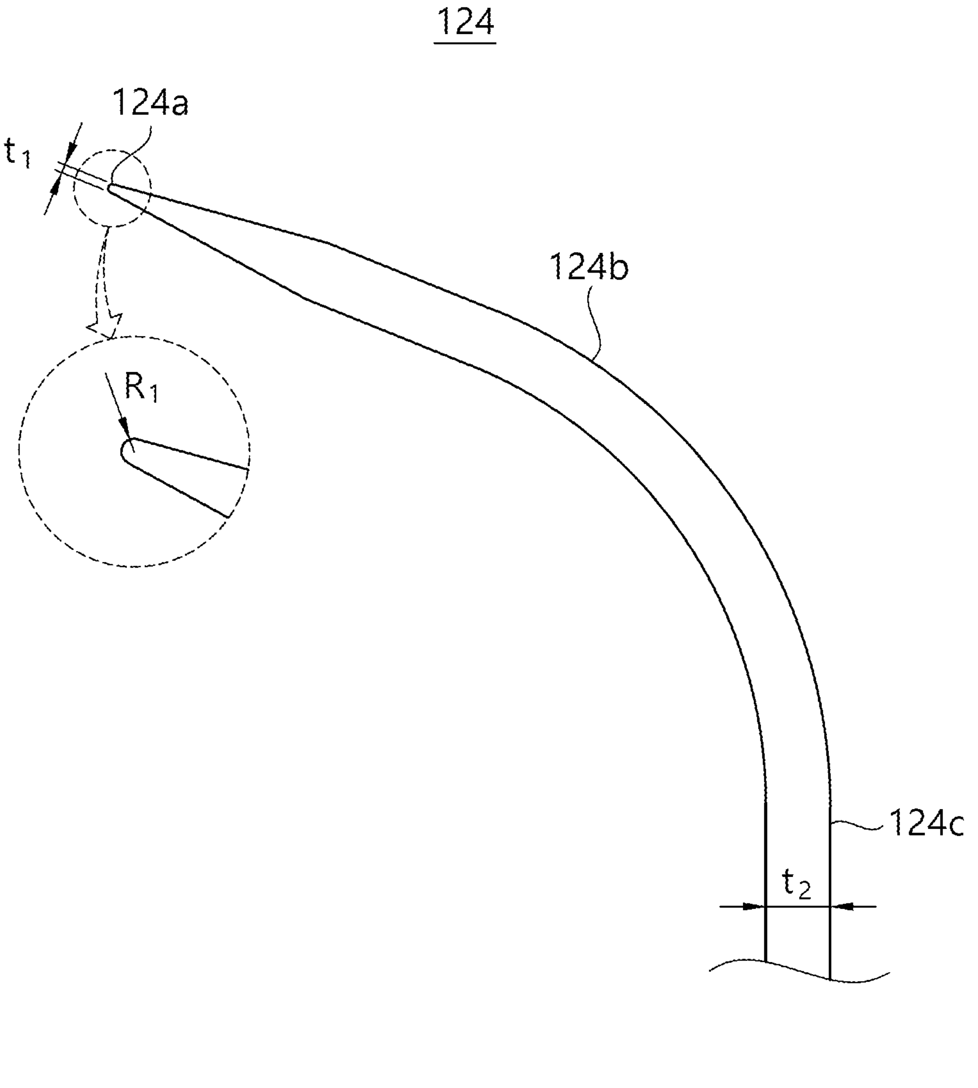
FIG. 4 is a view schematically showing a first blade according to an embodiment.

FIG. 4 is a view schematically showing a first blade according to an embodiment.

Referring to FIG. 4, the first blade 124 includes a first cutting edge 124*a*, a first bending portion 124*b*, and a first base portion 124*c*.

The first cutting edge 124*a* is processed sharply compared to the first bending portion 124*b* and the first base portion 124*c*, and is formed to extend from the first bending portion 124*b* in the shaving direction (or toward the guard 122). The first cutting edge 124*a* is configured to cut body hair during the shaving.

Figure 5:
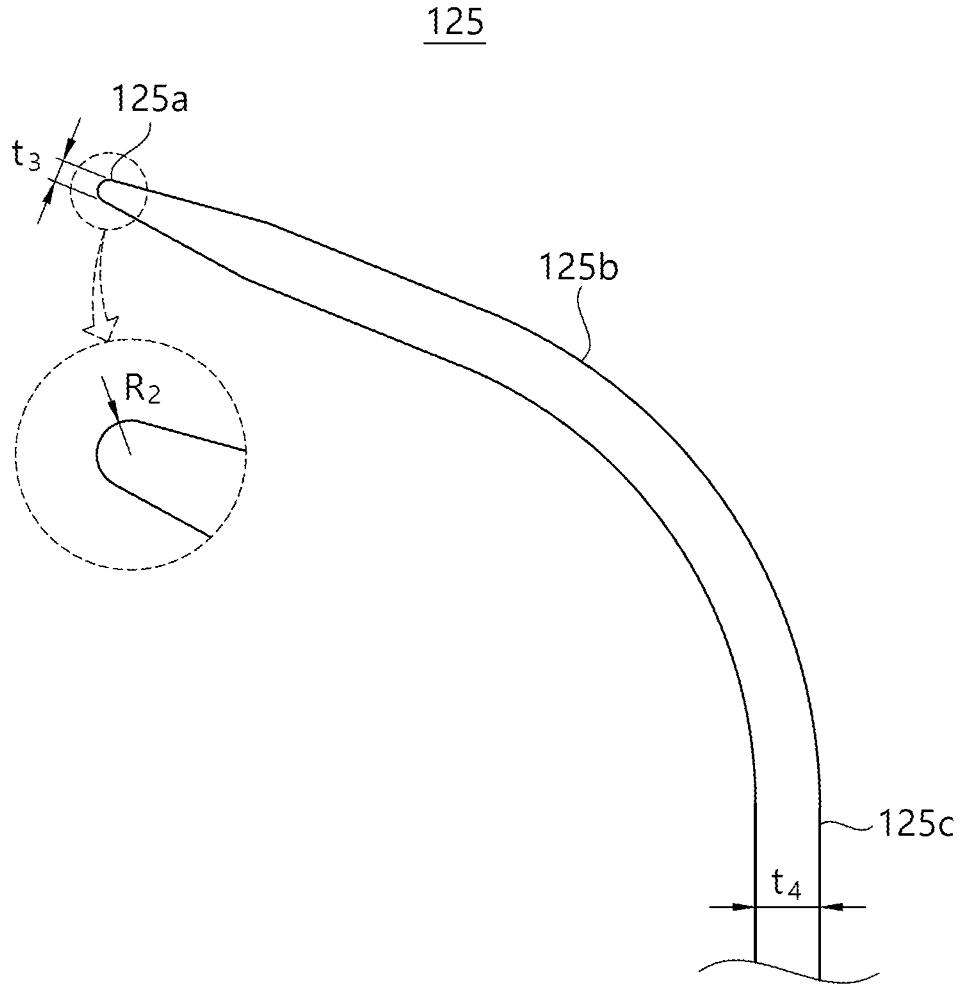
FIG. 5 is a view schematically showing a second blade according to an embodiment.

FIG. 5 is a view schematically showing a second blade according to an embodiment.

Referring to FIG. 5, the second blade 125 is disposed in front of the first blade 124 in the shaving direction to be adjacent to the first blade 124.

The second blade 125 includes a sliding edge 125*a*, a second bending portion 125*b*, and a second base portion 125*c*.

The second base portion 125*c* may be formed to have the same geometry as that of the first base portion 124*c*, and the second bending portion 125*b* may be formed to have the same geometry as that of the first bending portion 124*b*.

However, the sliding edge 125*a* is manufactured not to be as sharp as the first cutting edge 124*a*, and extends from the second bending portion 125*b* in the shaving direction (or toward the guard 122). The sliding edge 125*a* may serve to pull body hair or skin without cutting the body hair during the shaving.

To this end, referring to FIGS. 4 and 5, the sliding edge 125*a* may have a tip radius $R_2$ greater than a tip radius $R_1$ of the first cutting edge 124*a*. For example, the tip radius $R_1$ of the first cutting edge 124*a* may be formed to have a range of 0.005 to 0.5 μm, and the tip radius $R_2$ of the sliding edge 125*a* may be formed to have a range of 0.6 to 1.6 μm.

Meanwhile, the first cutting edge 124*a* is formed so that the ratio $t_1/t_2$ of a thickness $t_1$ of the first cutting edge 124*a* to a thickness $t_2$ of the first base portion 124*c* is less than 1.

The sliding edge 125 *a* is formed so that the ratio $t_3/t_4$ of a thickness $t_3$ of the sliding edge 125 *a* to a thickness $t_4$ of the second base portion 125 *c* is smaller than 1 but greater than the ratio $t_1/t_2$.

Therefore, during the shaving, the sliding edge 125*a* performs a function of pulling body hair without cutting the body hair, and the first cutting edge 124*a* of the first blade 124, which follows the second blade 125, proceeds while cutting the body hair pulled by the sliding edge 125*a*.

Since the fourth blade 127 or the third blade 126 is adjacent to the guard 122, the third blade 126 and/or the fourth blade 127 may cut the body hair pulled by the guard 122. However, since the first blade 124 is positioned at the rearmost among the plurality of blades 124, 125, 126, and 127 and the third blade 126 and/or the fourth blade 127 cuts the already cut body hair, it may be hard for the sliding edge 125*a* to reach the body hair pulled by the guard 122 if the sliding edge 125*a* is not provided in front of the first blade 124.

However, according to this embodiment, the sliding edge 125*a* is formed in the second blade 125 positioned in front of the first blade 124 and the first blade 124 cuts body hair pulled by the sliding edge 125*a*, and thus, it is possible to cut the body hair more deeply and have a shaving done cleanly.

In addition, compared to a razor cartridge in which a plurality of blades all include cutting edges, the razor cartridge according to the present embodiment in which the second blade 125 including the sliding edge 125*a* is included between the blades 124, 126, and 127 respectively including cutting edges is less irritating to the skin and thus enables a smoother shaving.

Referring to FIGS. 3, in order to smoothly discharge residues (cut body hair, shaving foam, etc.) generated during the shaving, the respective blades 124, 125, 126, and 127 are disposed so that a first rinsing gap $L_1$ forming a flow path through which the residue is discharged is formed between the edges 124*a* and 125*a*. The first rinsing gap $L_1$ may be a distance between every two adjacent blades 124, 125, 126, and 127 in a direction parallel to a direction in which the edges 124*a* and 125*a* extend, and the first rinsing gap $L_1$ may be formed to have a range of 0.25 to 0.31 mm, for example.

In addition, referring to FIG. 3, in order to smoothly discharge residue, the respective blades 124, 125, 126, and 127 may be disposed so that a second rinsing gap $L_2$ forming a flow path through which the residue is discharged is formed between an edge 124 *a* and a base portion 125 *c* (see FIG. 3), and between an edge 125 *a* and a base portion 126*c* of a third blade 126. For example, referring to FIG. 3, a first imaginary line 130*a* can be defined as a line extending from a lower portion of the first cutting edge 124*a* of the first blade 124 in a direction parallel to an extension direction of the first cutting edge. In addition, a second imaginary line 130*b* can be defined as a line extending from an upper portion of the sliding edge 125*a* of the second blade 125 in a direction parallel to an extension direction of the sliding edge. Similarly, a third imaginary line 130*c* can be defined as a line extending from a lower portion of the sliding edge 125*a* in a direction parallel to an extension direction of the sliding edge. Moreover, a fourth imaginary line 130*d* can be defined as a line extending from an upper portion of a second cutting edge 126*a* of the third blade 126 in a direction parallel to an extension direction of the second cutting edge. The first rinsing gap ($L_1$) may be defined as i) a distance between the first imaginary line and the second imaginary line, and ii) a distance between the third imaginary line and the fourth imaginary line. The second rinsing gap $L_2$ may be a distance between every two adjacent blades 124, 125, 126, and 127 in a direction parallel to a front-rear direction of the razor cartridge 10, and the second rinsing gap $L_2$ may be formed to have a range of 0.05 to 0.09 mm, for example. The rear blade housing 110 may include a first blade support 112, a second blade support 113, and a third blade support 114 respectively supporting the first blade 124, the second blade 125, and the third blade 126. The first blade support 112, the second blade support 113, and the third blade support 114 may respectively include a first curved portion 112*a*, a second curved portion 113*a*, and a third curved portion 114*a*. The first curved portion 112*a*, the second curved portion 113*a*, and the third curved portion 114*a* may respectively be in direct physical contact with and support the first bending portion 124*b* of the first blade 124, the second bending portion 125*b* of the second blade 125, and the third bending portion 126*b* of the third blade 126.

A second rinsing gap $L_2$ between the first blade 124 and the second blade 125 may be greater than a second rinsing gap $L_2$ between the second blade 125 and the third blade 126. For example, the second rinsing gap $L_2$ between the second blade 125 and the third blade 126 may be formed to have a range of 0.05 to 0.07 mm, and the second rinsing gap $L_2$ between the first blade 124 and the second blade 125 may be formed to have a range of 0.065 to 0.09 mm.

As described above, the second blade 125 may not perform cutting of body hair. Accordingly, the residue discharged between the second blade 125 and the third blade 126 may be less than the residue discharged between the other blades. Thus, the second rinsing gap $L_2$ between the second blade 125 and the third blade 126 may be formed to be smaller than the second rinsing gap $L_2$ between the other blades.

However, the first blade 124 performs cutting of body hair and cuts body hair pulled by the sliding edge 125*a* of the second blade 125, and thus, the residue discharged between the first blade 124 and the second blade 125 may be more than the residue discharged between the second blade 125 and the third blade 126. Therefore, the second rinsing gap $L_2$ between the first blade 124 and the second blade 125 may be formed to be greater than the second rinsing gap $L_2$ between the second blade 125 and the third blade 126.

A span distance between every two adjacent blades 124, 125, 126, and 127 (e.g., a distance between neighboring edges parallel to a shaving plane A) may be formed to have a range of about 0.8 to 1.2 mm.

The first base portion 124*c* and the second base portion 125*c* may have the same geometry, and the first bending portion 124*b* and the second bending portion may have the same geometry. In this case, a shape of the blade support 112 for insertion of the first blade 124 and a shape of the blade support 112 for insertion of the second blade 125 may be the same.

Therefore, there is no need to specially design the shape of the blade support 112 for the second blade 125 including the sliding edge 125*a*, and the second blade 125 according to this embodiment may apply even to a blade housing of an existing razor cartridge in which a cutting edge is formed in every blade.

In addition, the second blade 125 according to this embodiment is different from other blades 124, 126, and 127 in terms of thickness or tip radius of edge, but has a similar overall shape (e.g., a configuration comprised of a base portion, a bending portion, and an edge), span distances between the blades 124, 125, 126, and 127 may be maintained approximately constant. As the span distances between the blades 124, 125, 126, and 127 are provided constant, it is possible to prevent a shaving cut and provide a consistent shaving feeling.

Figure 6:
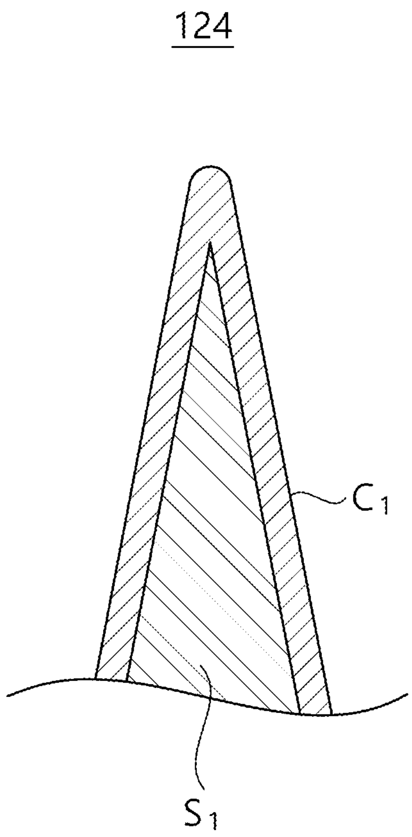
FIG. 6 is a view schematically showing a cross-section of a cutting edge of a first blade according to an embodiment.
Figure 7:
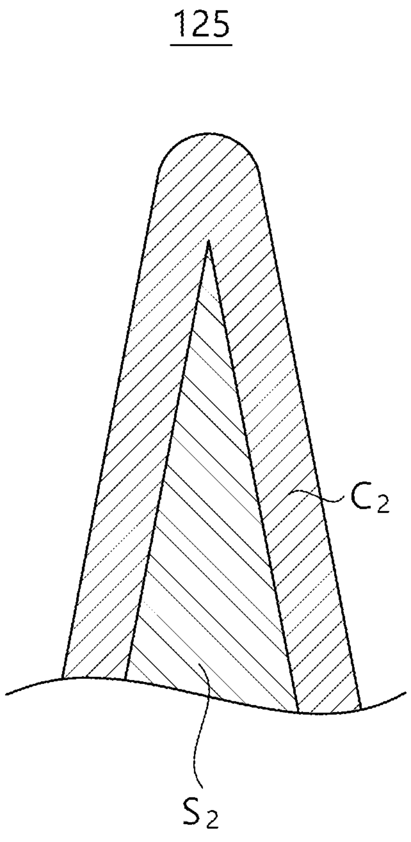
FIG. 7 is a view schematically showing a cross-section of a sliding edge of a second blade according to an embodiment.
Figure 8:
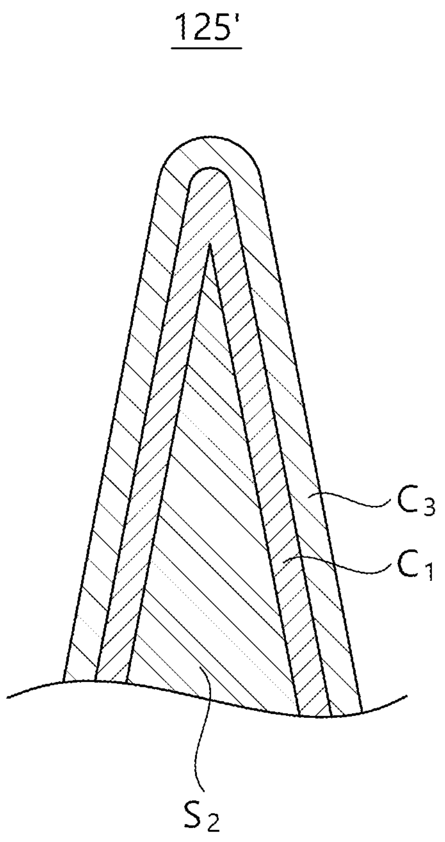
FIG. 8 is a view schematically showing a cross-section of a sliding edge of a second blade according to another embodiment.

FIGS. 6 to 8 are views for comparing and explaining a difference between coating layers of the first blade 124 and the second blade 125 according to an embodiment. For convenience of explanation, the first blade 124 and the second blade 125 are to be explained in comparison. Since the third blade 126 and the fourth blade 127 are substantially the same as the first blade 124, an additional description of the third blade 126 and the fourth blade 127 will be herein omitted.

FIG. 6 is a view schematically showing a cross-section of a cutting edge of a first blade according to an embodiment.

Referring to FIG. 6, the cutting edge 124*a* of the first blade 124 may be manufactured by forming a coating layer $C_1$ in a sharply processed substrate $S_1$. Although a single coating layer $C_1$ is shown in FIG. 6, the coating layer $C_1$ may include at least one or more coating layers. For example, the coating layer $C_1$ may include a coating to reinforce the rigidity of the substrate $S_1$, a coating to reduce friction between the cutting edge 124*a* and skin, a coating to increase a bonding force between adjacent coating layers, and the like.

FIG. 7 is a view schematically showing a cross-section of a sliding edge of a second blade according to an embodiment.

Referring to FIG. 7, the sliding edge 125*a* of the second blade 125 may also be manufactured by forming a coating layer $C_2$ in a sharply processed substrate $S_2$.

The substrate $S_2$ of the second blade 125 may be substantially the same as the substrate $S_1$ of the first blade 124. However, the sliding edge 125*a* of the second blade 125 may be manufactured to have the coating layer $C_2$ thicker than the coating layer $C_1$ of the cutting edge 124*a* of the first blade 124, so that a tip radius or thickness of the sliding edge 125*a* can be greater than a tip radius or thickness of the cutting edge 124*a*. In this case, it is not necessary to prepare a separate substrate for manufacturing the second blade 125, and the second blade 125 may be manufactured simply by maintaining a process time of forming the coating layer $C_2$ longer than a process time of forming the coating layer $C_1$ of the first blade 124.

However, in some embodiments, the sliding edge 125*a* of the second blade 125 may have a thickness approximately identical to a thickness of the cutting edge 124*a* of the first blade 124, whereas a thickness of the substrate for the second blade 125 may be greater than a thickness of the substrate for the first blade 124. Alternatively, both the substrate and the coating layer of the sliding edge 125*a* of the second blade 125 may be formed to be thicker than those of the cutting edge 124*a* of the first blade 124.

FIG. 8 is a view schematically showing a cross-section of a sliding edge of a second blade according to another embodiment.

Referring to FIG. 8, a sliding edge 125*a* of a second blade 125' may be manufactured by forming the first coating layer $C_1$ and a second coating layer $C_3$ in the sharply processed substrate $S_2$.

A state in which the first coating layer $C_1$ is formed in the substrate $S_2$ may be substantially the same as that of the cutting edge 124 *a* of the first blade 124. In the embodiment of FIG. 8, the second blade 125' may be manufactured by additionally forming the second coating layer $C_3$ in the second blade 125'.

That is, a tip radius or thickness of the sliding edge 125*a* may be formed to be greater than a tip radius or thickness of the cutting edge 124*a* by additionally forming the second coating layer $C_3$ in the cutting edge 124*a* of the first blade 124.

The second coating layer $C_3$ may be a coating layer having a color different from that of the first coating layer $C_1$. In this case, since the sliding edge 125*a* of the second blade 125' is expressed in a different color from that of the cutting edge 124*a* of the first blade 124, it is possible to visually distinguish the first blade 124 and the second blade 125' in processes of assembling and inspecting a razor cartridge. In addition, because a user of the razor cartridge 10 is able to visually check the existence of the second blade 125', it is possible to easily distinguish the razor cartridge 10 from an existing razor cartridge and easily recognize the function of the second blade 125'.

Meanwhile, in some embodiments, the second blade 125 may be formed based on a material different from a material of the first blade 124. The first blade 124 is formed based on a steel material in order to cut body hair and the like, but the second blade 125 performs a function of pulling the body hair rather than a function of cutting the body hair. Therefore, the second blade 125 may be formed based on a material capable of effectively pulling the body hair (e.g., rubber, plastic, silicone, etc.). In this case, the first blade 124 and the second blade 125 may be visually distinguished from each other due to color of materials, or the second blade 125 may be visually differentiated from the first blade 124 by forming a coating layer of a specific color in the second blade 125.

Referring back to FIG. 3, a cutting edge of at least one of the first blade 124, the third blade 126, and the fourth blade 127 may be disposed to have a negative protrusion value from the shaving plane A, whereas the second blade 125 may be disposed so that the sliding edge 125*a* has a positive protrusion value from the shaving plane A.

The shaving plane A is a plane on which the user's skin and the razor cartridge 10 come into contact with each other. The shaving plane A may be determined by a shape of the blade housing 110 and 120. For example, referring to FIG. 3, the front housing 120 may be defined as a plane that is in contact with the guard 122 and the lubricating band 123.

The fact that a cutting edge is disposed to have a negative protrusion value from the shaving plane A indicates that the cutting edge is positioned below the shaving plane A, which in other words means that the cutting edge is disposed to be spaced apart in a direction away from the skin with respect to the shaving plane A.

The fact that the sliding edge 125*a* is disposed to have a positive protrusion value from the shaving plane A indicates that the sliding edge 125*a* is disposed above the shaving plane A, which in other words means that the sliding edge 125*a* is disposed to be spaced apart in a direction closer to the skin with respect to the shaving plane A.

In particular, the cutting edge 124*a* of the first blade 124 may be formed to have a negative protrusion value from the shaving plane A, and the sliding edge 125*a* may be formed to have a positive protrusion value from the shaving plane A. Since the sliding edge 125*a* has a positive protrusion value from the shaving plane A, a traction force for the skin/body hair by the sliding edge 125*a* is improved. In addition, since the cutting edge 124*a* of the first blade 124 has a negative protrusion value from the shaving plane A, skin irritation caused by shaving the skin may be reduced, thereby ensuring shaving safety.

In addition, the cutting edge of the third blade 126 may be formed to have a negative protrusion value from the shaving plane A, and the sliding edge 125*a* may be formed to have a positive protrusion value from the shaving plane A. In this case, a probability of the skin to be cut by the cutting edge of the third blade 126 is lowered, thereby improving shaving safety.

Figure 9:
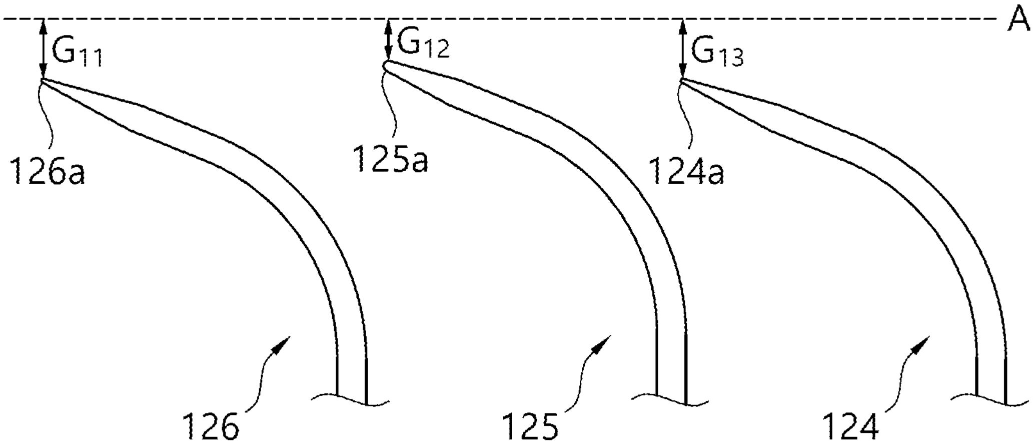
FIG. 9 is a view schematically showing a state in which a sliding edge has a negative protrusion value from a shaving plane.

FIG. 9 is a view schematically showing a state in which a sliding edge has a negative protrusion value from a shaving plane.

Referring to FIG. 9, the second blade 125 may be disposed so that the sliding edge 125*a* has a negative protrusion value from the shaving plane A.

In this case, the first blade 124 and/or the third blade 126 may be disposed so that each of the cutting edges 124*a* and 126*a* also has a negative protrusion value from the shaving plane A.

However, the sliding edge 125*a* may be disposed closer to the shaving plane A than the cutting edge 124*a* of the first blade 124 is ($G_{12}<G_{13}$), or the sliding edge 125*a* may be disposed closer to the shaving plane A than the cutting edge 126*a* of the third blade 126 is ($G_{12}<G_{11}$).

In this case, it is possible to achieve the same effect as that of a case where the sliding edge 125*a* is formed to have a positive protrusion value from the shaving plane A and the cutting edge 124*a* of the first blade 124 and/or the cutting edge 126*a* of the third blade 126 is formed to have a negative protrusion value from the shaving plane A.

Figure 10:
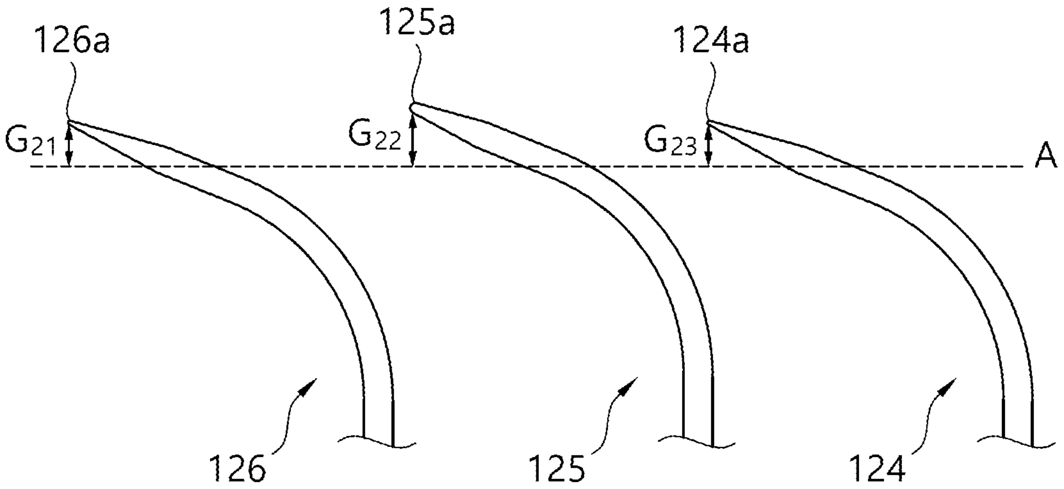
FIG. 10 is a view schematically showing a state in which a cutting edge of a first blade and/or a third blade has a positive protrusion value from a shaving plane.

FIG. 10 is a view schematically showing a state in which a cutting edge of a first blade and/or a third blade has a positive protrusion value from a shaving plane;

Referring to FIG. 10, the cutting edge 124*a* of the first blade 124 and/or the cutting edge 126*a* of the third blade 126 may be disposed to have a positive protrusion value from the shaving plane A.

In this case, the sliding edge 125*a* may also be disposed to have a positive protrusion value from the shaving plane A.

However, the cutting edge 124*a* of the first blade 124 is disposed to be closer to the shaving plane A than the sliding edge 125*a* is ($G_{22}>G_{23}$), or the cutting edge 126*a* of the third blade 126 may be disposed to be closer to the shaving plane A than the sliding edge 125*a* is ($G_{22}>G_{21}$).

In this case, it is possible to achieve the same effect of the case where the sliding edge 125*a* is formed to have a positive protrusion value from the shaving plane A and the cutting edge 124*a* of the first blade 124 and/or the cutting edge 126*a* of the third blade 126 is formed to have a negative protrusion value from the shaving plane A.

Figure 11:
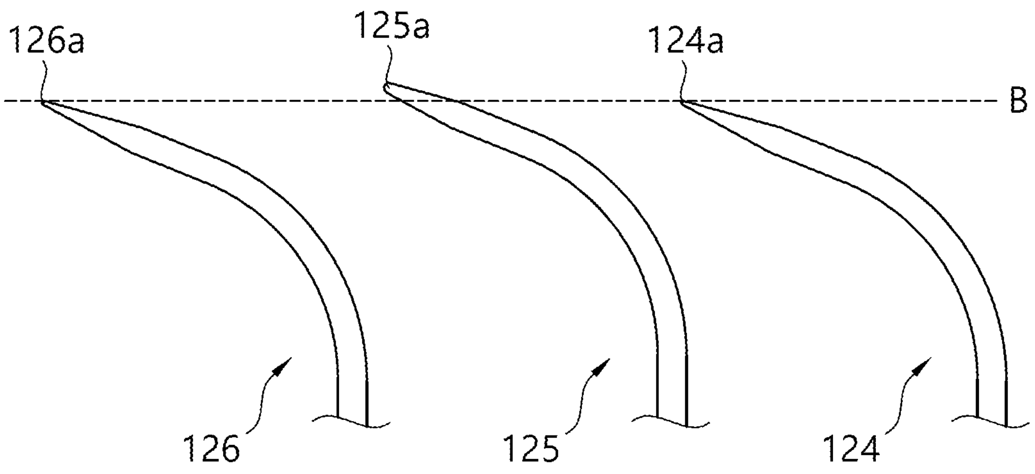
FIG. 11 is a view for explaining relative arrangement between the cutting edge of the first blade, the sliding edge of the second blade, and the cutting edge of the third blade according to an embodiment.

FIG. 11 is a view for explaining relative arrangement between the cutting edge of the first blade, the sliding edge of the second blade, and the cutting edge of the third blade according to an embodiment.

Referring to FIG. 11, the sliding edge 125*a* of the second blade 125 may be disposed to have a positive protrusion value from a virtual plane B, which connects the cutting edge 124*a* of the first blade 124 and the cutting edge 126*a* of the third blade 126.

In this case, it is possible to achieve the same effect of the case where the sliding edge 125*a* is formed to have a positive protrusion value from the shaving plane A and the cutting edge 124*a* of the first blade 124 and/or the cutting edge 126*a* of the third blade 126 is formed to have a negative protrusion value from the shaving plane A.

As described with reference to FIGS. 3 and 9 to 11, the sliding edge 125*a* may protrude upward toward the skin than the cutting edge 124*a* of the first blade 124 and/or the cutting edge 126*a* of the third blade 126 is. For example, the sliding edge 125*a* may protrude upward by a length of 0.1 to 0.05 mm further than the cutting edge 124*a* of the first blade 124 and/or the cutting edge 126*a* of the third blade 126 does.

As described above, in a razor and a razor cartridge according to the present disclosure, at least one of a plurality of blades forms a sliding edge rather than a cutting edge. The sliding edge plays a role of pulling body hair/skin in a shaving direction, rather than cutting body hair, during shaving, so that a cutting edge following the sliding edge can cut the body hair pulled by the sliding edge, enabling a cleaner shaving.

In addition, since the sliding edge protrudes toward the skin compared to other cutting edges are, a traction force for body hair/skin by the sliding edge may be improved. Further, because the cutting edge is positioned before the sliding edge, it may reduce a probability of shaving cuts and improve shaving safety. Moreover, skin irritation caused by the cutting edge following the sliding edge is reduced, thereby enabling shaving safety.

It will be evident to those skilled in the art that various modifications and changes may be made in the exemplary embodiments of the present disclosure without departing from the technical idea or the gist of the present disclosure. Therefore, it should be understood that the above-mentioned embodiments are not limiting but illustrative in all aspects. It should be appreciated that the scope of the present disclosure is defined by the following claims rather than the above-mentioned detailed descriptions and all modifications or alterations deduced from the meaning, the scope, and equivalences of the claims are to be construed as falling within the scope of the present disclosure.

What is claimed is:

1. A razor cartridge comprising:

a first blade including a first base portion and a first cutting edge, wherein the first blade further comprises a first bending portion that connects the first base portion and the first cutting edge so that the first base portion and the first cutting edge extend in different directions;

a second blade adjacent to the first blade and including a second base portion and a sliding edge, wherein the second blade further comprises a second bending portion that connects the second base portion and the sliding edge so that the second base portion and the sliding edge extend in different directions, wherein the first bending portion and the second bending portion have a same geometry;

a third blade adjacent to the second blade and including a third base portion, a second cutting edge, and a third bending portion that connects the third base portion and the third cutting edge, wherein the first blade is positioned on a right side of the second blade, and wherein the third blade is positioned on a left side of the second blade; and a blade housing supporting the first base portion to have at least a portion of the first cutting edge exposed, supporting the second base portion to have at least a portion of the sliding edge exposed, and supporting the third base portion to have at least a portion of the second cutting edge exposed, the blade housing comprising a first blade support, a second blade support, and a third blade support respectively supporting the first blade, the second blade, and the third blade, the first blade support, the second blade support, and the third blade support respectively comprising a first curved portion, a second curved portion, and a third curved portion, the first curved portion, the second curved portion, and the third curved portion respectively being in direct physical contact with and supporting the first bending portion of the first blade, the second bending portion of the second blade, and the third bending portion of the third blade, wherein the second blade is formed so that a ratio $t_3/t_4$ of a thickness $t_3$ of the sliding edge to a thickness $t_4$ of the second base portion is less than 1 and greater than a ratio $t_1/t_2$ of a thickness $t_1$ of the first cutting edge to a thickness $t_2$ of the first base portion, wherein the first blade, the second blade, and the third blade are disposed to form a first rinsing gap ($L_1$) and a second rinsing gap ($L_2$) each configured to form a flow path through which shaving residues are discharged, the first rinsing gap ($L_1$) defined as i) a distance between the first blade and the second blade in a direction parallel to a direction in which the first cutting edge and the sliding edge extend, and ii) a distance between the second blade and the third blade in a direction parallel to a direction in which the sliding edge and the second cutting edge extend, the second rinsing gap ($L_2$) defined as a distance between the first cutting edge and the second base portion, and between the sliding edge and the third base portion, in a direction parallel to a front-rear direction of the razor cartridge, and wherein the second rinsing gap ($L_2$) between the first cutting edge and the second base portion is greater than the second rinsing gap ($L_2$) between the sliding edge and the third base portion, wherein:

a first imaginary line is defined as a line extending from a lower portion of the first cutting edge in a direction parallel to an extension direction of the first cutting edge, a second imaginary line is defined as a line extending from an upper portion of the sliding edge in a direction parallel to an extension direction of the sliding edge, a third imaginary line is defined as a line extending from a lower portion of the sliding edge in a direction parallel to the extension direction of the sliding edge, a fourth imaginary line is defined as a line extending from an upper portion of the second cutting edge in a direction parallel to an extension direction of the second cutting edge, the first rinsing gap (L1) is defined as i) a distance between the first imaginary line and the second imaginary line, or ii) a distance between the third imaginary line and the fourth imaginary line, the first rinsing gap (L1) is greater than the second rinsing gap (L2).

2. The razor cartridge of claim 1, wherein during shaving, the first blade follows the second blade, and the first cutting edge cuts body hair while at least one of skin or the body hair is pulled by the sliding edge.

3. The razor cartridge of claim 1, wherein the first base portion and the second base portion have the same thickness.

4. The razor cartridge of claim 1, wherein the sliding edge has a tip radius greater than a tip radius of the first cutting edge.

5. The razor cartridge of claim 4, wherein a tip radius of the first cutting edge has a value of 0.005 to 0.5 μm, and wherein a tip radius of the sliding edge has a value of 0.6 to 1.6 μm.

6. The razor cartridge of claim 1, wherein the first cutting edge and the sliding edge are disposed to have a negative protrusion value from a shaving plane defined by the blade housing, and the sliding edge is disposed to be closer to the shaving plane than the first cutting edge is.

7. The razor cartridge of claim 1, wherein the first cutting edge and the sliding edge are disposed to have a positive protrusion value from a shaving plane defined by the blade housing, and the first cutting edge is disposed closer to the shaving plane than the sliding edge is.

8. The razor cartridge of claim 1, wherein the sliding edge is disposed to have a positive protrusion value from a shaving plane defined by the blade housing, and wherein the first cutting edge is disposed to have a negative protrusion value from the shaving plane.

9. The razor cartridge of claim 1, wherein the sliding edge is disposed to have a positive protrusion value from a virtual plane that connects the first cutting edge and the second cutting edge.

10. The razor cartridge of claim 1, wherein each of the first blade and the second blade has a coating layer laminated on a substrate thereof, and wherein the sliding edge has a thickness of the coating layer formed to be thicker than a thickness of the coating layer of the first cutting edge.

11. The razor cartridge of claim 10, wherein the thickness of the coating layer of the first cutting edge has a value of 0.05 to 0.3 μm, and wherein the thickness of the coating layer of the sliding edge has a value of 0.5 to 1.9 μm.

12. The razor cartridge of claim 1, wherein each of the first blade and the second blade has a coating layer laminated on a substrate thereof, and wherein a substrate of the sliding edge has a thickness greater than a thickness of a substrate of the first cutting edge.

13. The razor cartridge of claim 1, wherein the sliding edge and the first cutting edge are formed based on different materials.

14. The razor cartridge of claim 1, wherein the sliding edge has a color different from a color of the first cutting edge.

15. The razor cartridge of claim 1, wherein the first rinsing gap ($L_1$) is in a range of 0.25 mm to 0.31 mm.

16. The razor cartridge of claim 1, wherein the second rinsing gap ($L_2$) between the first cutting edge and the second base portion is in a range of 0.065 mm to 0.09 mm, and wherein the second rinsing gap ($L_2$) between the sliding edge and the third base portion is in a range of 0.05 mm to 0.07 mm.

17. A razor cartridge comprising:

a first blade including a first base portion and a first cutting edge, wherein the first blade further comprises a first bending portion that connects the first base portion and the first cutting edge so that the first base portion and the first cutting edge extend in different directions;

a second blade including a second base portion and a sliding edge, wherein the second blade further comprises a second bending portion that connects the second base portion and the sliding edge so that the second base portion and the sliding edge extend in different directions, wherein the first bending portion and the second bending portion have a same geometry;

a third blade adjacent to the second blade and including a third base portion, a second cutting edge, and a third bending portion that connects the third base portion and the third cutting edge, wherein the first blade is positioned on a right side of the second blade, and wherein the third blade is positioned on a left side of the second blade; and a blade housing supporting the first base portion to have at least a portion of the first cutting edge exposed, supporting the second base portion to have at least a portion of the sliding edge exposed, and supporting the third base portion to have at least a portion of the second cutting edge exposed, the blade housing comprising a first blade support, a second blade support, and a third blade support respectively supporting the first blade, the second blade, and the third blade, the first blade support, the second blade support, and the third blade support respectively comprising a first curved portion, a second curved portion, and a third curved portion, the first curved portion, the second curved portion, and the third curved portion respectively being in direct physical contact with and supporting the first bending portion of the first blade, the second bending portion of the second blade, and the third bending portion of the third blade, wherein the sliding edge is formed to have a tip radius greater than a tip radius of the first cutting edge, wherein the first blade, the second blade, and the third blade are disposed to form a first rinsing gap ($L_1$) and a second rinsing gap ($L_2$) each configured to form a flow path through which shaving residues are discharged, the first rinsing gap ($L_1$) defined as i) a distance between the first blade and the second blade in a direction parallel to a direction in which the first cutting edge and the sliding edge extend, and ii) a distance between the second blade and the third blade in a direction parallel to a direction in which the sliding edge and the second cutting edge extend, the second rinsing gap ($L_2$) defined as a distance between the first cutting edge and the second base portion, and between the sliding edge and the third base portion, in a direction parallel to a front-rear direction of the razor cartridge, and wherein the second rinsing gap ($L_2$) between the first cutting edge and the second base portion is greater than the second rinsing gap ($L_2$) between the sliding edge and the third base portion;

wherein:

a first imaginary line is defined as a line extending from a lower portion of the first cutting edge in a direction parallel to an extension direction of the first cutting edge, a second imaginary line is defined as a line extending from an upper portion of the sliding edge in a direction parallel to an extension direction of the sliding edge, a third imaginary line is defined as a line extending from a lower portion of the sliding edge in a direction parallel to the extension direction of the sliding edge, a fourth imaginary line is defined as a line extending from an upper portion of the second cutting edge in a direction parallel to an extension direction of the second cutting edge, the first rinsing gap (L1) is defined as i) a distance between the first imaginary line and the second imaginary line, or ii) a distance between the third imaginary line and the fourth imaginary line, the first rinsing gap (L1) is greater than the second rinsing gap (L2).

18. The razor cartridge of claim 17, wherein a tip radius of the first cutting edge has a value of 0.005 to 0.5 μm, and wherein a tip radius of the sliding edge has a value of 0.6 to 1.6 μm.

* * * * *